US011350351B2

(12) United States Patent
Liu et al.

(10) Patent No.: US 11,350,351 B2
(45) Date of Patent: May 31, 2022

(54) FAILURE-INDUCED SELECTION OF NEW RADIO CARRIERS

(71) Applicant: T-Mobile USA, Inc., Bellevue, WA (US)

(72) Inventors: Jun Liu, Issaquah, WA (US); Jeff Ahmet, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 35 days.

(21) Appl. No.: 16/913,106

(22) Filed: Jun. 26, 2020

(65) Prior Publication Data

US 2021/0410050 A1 Dec. 30, 2021

(51) Int. Cl.
| | |
|---|---|
| *H04W 4/00* | (2018.01) |
| *H04W 48/16* | (2009.01) |
| *H04W 76/18* | (2018.01) |
| *H04W 76/27* | (2018.01) |
| *H04W 24/10* | (2009.01) |
| *H04W 76/19* | (2018.01) |

(52) U.S. Cl.
CPC .......... *H04W 48/16* (2013.01); *H04W 24/10* (2013.01); *H04W 76/18* (2018.02); *H04W 76/19* (2018.02); *H04W 76/27* (2018.02)

(58) Field of Classification Search
CPC ..... H04W 28/04; H04W 24/00; H04W 24/08; H04W 24/10; H04W 48/16; H04W 76/19; H04W 76/27; H04W 36/30; H04W 36/18; H04W 36/08; H04W 36/32; H04W 36/0083; H04W 72/04; H04W 72/042; H04W 88/08; H04L 5/0007; H04L 1/0026
USPC ............................. 370/329; 455/436, 67.11
See application file for complete search history.

(56) References Cited

U.S. PATENT DOCUMENTS

| | | | | |
|---|---|---|---|---|
| 2008/0320108 A1* | 12/2008 | Murty | .................... | H04W 48/20 709/220 |
| 2014/0198769 A1* | 7/2014 | Kazmi | .............. | H04W 36/0077 370/331 |
| 2015/0207672 A1* | 7/2015 | Xu | .................... | H04W 36/0079 370/221 |
| 2020/0252847 A1* | 8/2020 | Park | ...................... | H04W 88/14 |

* cited by examiner

*Primary Examiner* — Temica M Beamer
(74) *Attorney, Agent, or Firm* — Lee & Hayes, P.C.

(57) ABSTRACT

A first base station configured to exclude a first carrier from a list of multiple carriers of a second base station is described herein. Prior to excluding the first carrier, the first base station may select the first carrier for a user equipment (UE) based on first measurements of the multiple carriers of the second base station. The first base station may then determine that a connection between the UE and the second base station via the first carrier has failed and may provide an updated list of the multiple carriers of the second base station to the UE, the updated list excluding the first carrier. The first base station may then receive from the UE second measurements of the multiple carriers included in the updated list and select a second carrier of the second base station for the UE based on the second measurements.

15 Claims, 4 Drawing Sheets

FAILURE-INDUCED SELECTION OF NEW RADIO CARRIERS

BACKGROUND

Cellular communication devices, such as mobile devices, use network radio access technologies to communicate wirelessly with geographically distributed cellular base stations. Long-Term Evolution (LTE) is an example of a widely implemented radio access technology that is used in $4^{th}$-Generation (4G) communication systems. New Radio (NR) is a newer radio access technology that is used in $5^{th}$-Generation (5G) communication systems. Standards for LTE and NR radio access technologies have been developed by the 3rd Generation Partnership Project (3GPP) for use by wireless communication carriers.

An architecture defined by the 3GPP, referred to as Non-Standalone (NSA) Architecture, specifies the simultaneous use of LTE and NR for communications between a mobile device and a communication network. Specifically, NSA uses dual connectivity, in which the mobile device uses both LTE and NR communication links for transmissions to and from corresponding LTE and NR base stations. An LTE link is used for control-plane messaging and for user-plane communications. An NR link is used for additional user-plane bandwidth.

When using NSA, a LTE base station (referred to as a Master eNodeB or MeNB) is associated with a NR base station (referred to as a Secondary gNodeB or SgNB). In an NSA system, both the LTE base station and the NR base station utilize a 4G, LTE core network. However, control communications are between the core network and the LTE base station, and the LTE base station is configured to communicate with and to control the NR base station.

In an NSA system, a mobile device initially connects to an LTE base station. When in a connected state, the LTE base station instructs the device to perform measurements for one or more NR carriers associated with the NR base station. Upon receiving a measurement report from the mobile device, the LTE base station selects a NR carrier for the mobile device based at least on the measurements and instructs the mobile device to connect to the selected carrier. If the connection to the selected carrier fails, the process of measurement, selection, and connection repeats.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for improving NR carrier selection for a UE by an LTE base station based on managing a list of NR carriers that the LTE base station provides to the UE. The LTE base station determines a list of NR carriers available to a UE and provides that list to the UE. The UE then performs measurements (e.g., signal strength, quality, etc.) for each of the NR carriers and provides those measurements to the LTE base station. Based on some criteria, the LTE base station instructs the UE to connect to one of the NR carriers.

In some implementations, however, the connection may fail. For example, an NR carrier may have a strong downlink and weak uplink, but the measurements performed by the UE may only detect the strong downlink. In such circumstances, the same failed NR carrier may be selected again and again by the LTE base station based on measurement reports from the UE.

The LTE base station may avoid repeated selection of the failed NR carrier by removing that failed NR carrier from the list of NR carriers sent to the UE for measurement. The UE may then measure all NR carriers except the failed NR carrier (due to its absence from the list) and send a measurement report to the LTE base station, which may then select among the NR carriers with measurements. The result, then, is a selection of a different NR carrier for the UE. Should that NR carrier also fail, it too may be removed from the list by the LTE base station.

In some implementations, the LTE base station maintains a failure indicator, such as a performance counter, used to track failed connections to an NR carrier by a UE and to only remove the failed NR carrier from the list provided to the UE upon the number of failures meeting a threshold. For example, a UE may connect to a given NR carrier three different times, each connection failing, based on instructions from the LTE base station. Upon the third failure, the LTE base station may determine that a threshold is met and may remove the failed NR carrier from the list provided to the UE. The UE may then measure the other NR carriers, provide a measurement report, and be instructed to connect to one of the other NR carriers.

In further implementations, management of the NR carrier list may be adjusted through increasing or decreasing the threshold used for the failure indicator or by periodically (or on an event-driven basis) resetting the failure indicator.

Figure 1:
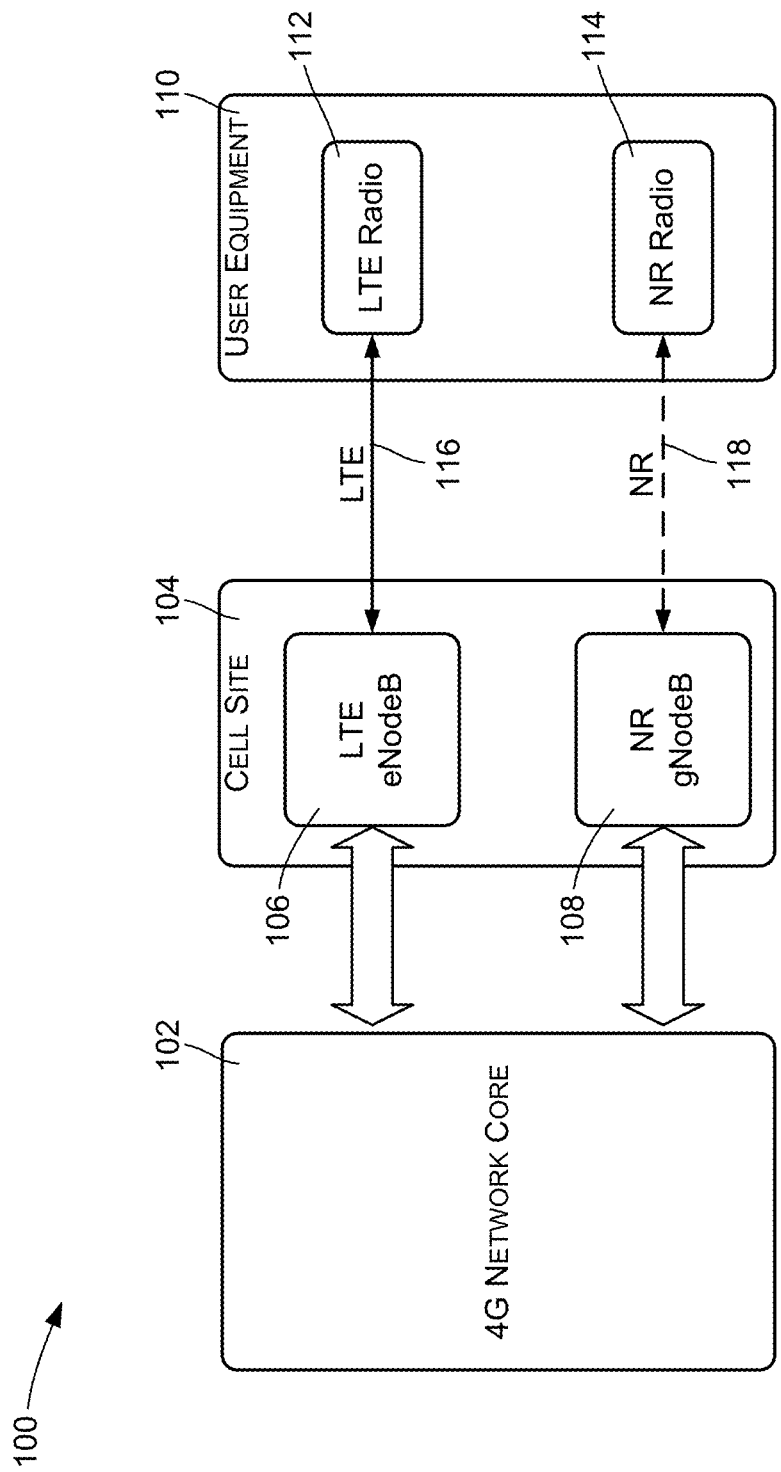
FIG. 1 is a block diagram showing relevant components of a communication network that supports NSA dual connectivity based on 4G and 5G radio access technologies.

FIG. 1 is a block diagram showing relevant components of a communication system 100 that supports NSA dual connectivity based on 4G and 5G radio access technologies. The components shown in FIG. 1 may be used to implement dual connectivity, for use in a Non-Standalone Architecture (NSA) configuration. When using NSA, a communication device, such as a UE, uses both a Long-Term Evolution (LTE) carrier and a New Radio (NR) carrier for uplink and downlink transmissions to and from respective LTE and NR base stations. The LTE carrier is used for control-plane messaging and for user-plane communications. The NR carrier is used for additional user-plane bandwidth.

For purposes of discussion, a $4^{th}$-Generation (4G) or LTE component is a component that performs according to 4G or LTE communications standards. A 4G or LTE signal or communication is a signal or communication that accords with 4G or LTE communications standards. A $5^{th}$-Generation (5G) or NR component is a component that performs according to 5G or NR communications standards. A 5G or NR signal or communication is a signal or communication that accords with 5G or NR communications standards.

The communication system 100 has a 4G network core 102. The communication system 100 also has multiple cellular sites 104, only one of which is shown in FIG. 1 for purposes of discussion.

As may be understood, the communication system 100 may be implemented in accordance with any one of Option 3, 3a, 3x, 4, 4a, 7, 7a, and/or 7x, as defined by 3GPP. That is, the communication system 100 may include a 5G core and/or may include additional data-plane or control-plane signaling. In general, the techniques discussed herein may be implemented in any dual connectivity, multi connectivity, or multiple bearer environment.

The illustrated cellular site 104 has collocated 4G and 5G cellular access points, and therefore supports both 4G and 5G communications. The 4G access point is implemented as an LTE base station 106, also referred to as an eNodeB, a master eNodeB, or a master base station. The 4G access point is associated with a 5G access point, which is implemented as an NR base station 108. The NR base station 108 may also be referred to as a gNodeB, a secondary gNodeB, or a secondary base station. The 4G network core 102 communicates with the LTE base station 106 and the NR base station 108. When using NSA, radio communications are controlled by the LTE/master base station 106. Other communication paths may be used in other implementations.

FIG. 1 shows a single cellular communication device 110, referred to hereinafter as UE 110, which is one of many such devices that are configured for use with the communication system 100. In the described embodiment, the UE 110 supports both 4G LTE and 5G NR networks and communications. Accordingly, the UE 110 has an LTE radio 112 that communicates wirelessly with the LTE base station 106 of the cellular site 104 and an NR radio 114 that communicates wirelessly with the NR base station 108 of the cellular site 104.

The UE 110 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the UE 110 may be referred to as a Mobile Station (MS).

The LTE base station 106 and the NR base station 108 in the examples described below are associated with each other by being collocated at a single cellular site 104. Although only a single pair of LTE and NR base stations 106 and 108 is shown in FIG. 1, the system 100 may include multiple cellular sites.

The UE 110 may communicate through either or both of the LTE base station 106 and the NR base station 108. In some cases or embodiments, the UE 110 may support dual connectivity communications, in which a single communication session concurrently uses both a 4G connection and a 5G connection. More specifically, the UE 110 may operate using NSA, using 5G NR radio technologies to augment 4G LTE communication capabilities. When using NSA, the UE 110 uses both an LTE carrier 116 and an NR carrier 118 for downlink data reception and uplink data transmissions. The LTE carrier 116 is used for control-plane messaging and for user-plane communications. The NR carrier 118 is used for additional user-plane bandwidth. The NR carrier 118 is illustrated as a dashed line to indicate its secondary nature relative to the LTE carrier 116. The following discussion will assume that the UE 110 is in connected mode and using NSA.

The LTE and NR carriers 116 and 118 are implemented using signals having frequencies that are in respective frequency bands. The LTE frequency band used by the LTE carrier 116 at any given time will be referred to as the active LTE frequency band. The NR frequency band used by the NR carrier 118 at any given time will be referred to as the active NR frequency band. It is assumed in the following examples that each of the LTE and NR base stations 106 and 108 supports multiple frequency bands. That is, each base station implements multiple cells, which correspond respectively to different frequency bands.

Although the techniques are described in the context of 4G and 5G networks, the techniques described herein may also be used with different network types, standards, and technologies. That is, the techniques may be used more generally for first and second wireless communication networks, where a 4G network is an example of the first wireless communication network and a 5G network is an example of the second wireless communication network.

Figure 2C:
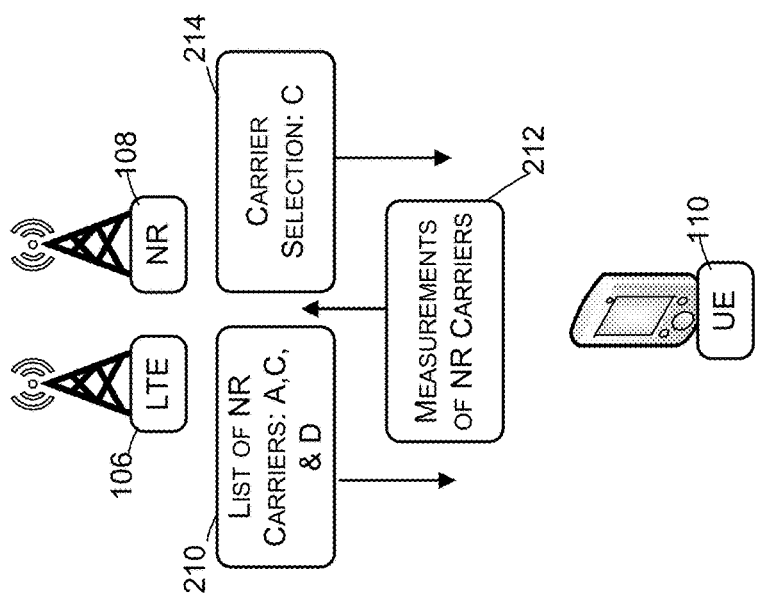
FIGS. 2a-2c are diagrams illustrating NR carrier selection for a user equipment (UE) by a 4G base station, including communications resulting in alternate carrier selection in the event of NR carrier failure(s).
Figure 2B:
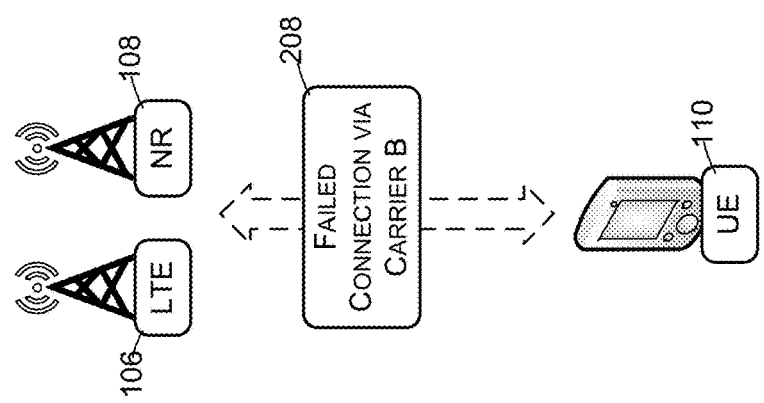
Figure 2A:
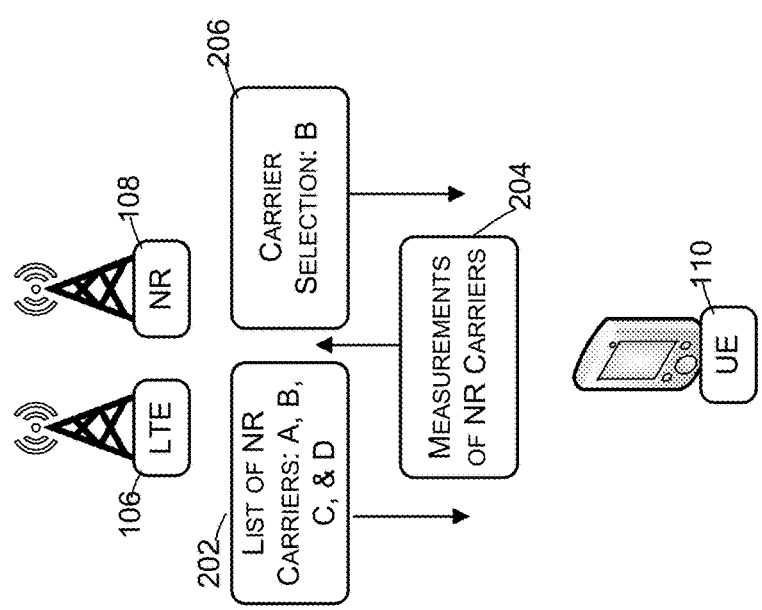

FIGS. 2a-2c are diagrams illustrating NR carrier selection for a user equipment (UE) by a 4G base station, including communications resulting in alternate carrier selection in the event of NR carrier failure(s).

While the NSA arrangement illustrated in FIGS. 2a-2c includes an LTE base station 106 and a NR base station 108, other base station pairs utilizing different radio access technologies may also operate in the manner described for base stations 106 and 108. For example, base stations 106 and 108 may each be NR base stations, with one base station acting as a MeNB and the other acting as a SgNB. As with the LTE base station 106 serving as MeNB, an NR base station 106 serving as MeNB would handle control plane messaging for both the NR base station 106 and the NR base station 108. For the sake of illustration, however, further reference to base stations 106 and 108 will be to an LTE base station 106 and a NR base station 108.

In FIG. 2a, the LTE base station 106 provides a list of NR carriers 202 to UE 110, receives a measurement report 204 from the UE 110 in response, and sends a selection 206 of an NR carrier to the UE 110 based on the measurement report 204.

Prior to the LTE base station 106 providing the list of NR carriers 202, the UE 110 connects to the LTE base station 106. The connection establishment may include an attach procedure in which the UE 110 indicates its capabilities. For example, the UE 110 may indicate that it is E-UTRAN NR—Dual Connectivity (EN-DC)-capable, at least for certain frequency bands. In response to such a capability indication from the UE 110, the LTE base station 106 may form and provide the NR carrier list 202. The list of NR carriers 202 may include all NR carriers supported by the NR base station 108, or at least a subset in the frequency bands for which UE 110 is EN-DC-capable. For example, as shown in FIG. 2a, the list of NR carriers 202 may specify NR carriers A, B, C, and D.

In some implementations, the NR base station 108 may inform the LTE base station that a NR carrier is temporarily or permanently unavailable, and the LTE base station 106 may remove that NR carrier from the list 202. Additionally, or instead, the LTE base station 106 may detect that an NR carrier is unavailable and may remove that NR carrier from the list 202. "Availability" may refer to signal strength, packet loss, latency, or other issues with connectivity associated with an NR carrier.

In various implementations, the UE 110 may then perform measurements for each NR carrier included in the list 202. Such performance measurements may determine metrics for signal strength, packet loss, latency, etc. The UE 110 may take the measurements at the physical layer of the network stack and generate a report at the RLC layer. In some implementations, the UE 110 may report the measurements themselves. In other implementations, measurements may be compared to thresholds and events generated when thresholds (e.g., signal strength thresholds) are met. Events, such as B1 events, may then be included in the measurement report 204. Such events and/or measurements may be provided for all of NR carriers, such as carriers A, B, C, and D shown in FIG. 2*a*.

In various implementations, the LTE base station 106 may then instruct in a message 206 the UE 110 to connect to one of the NR carriers (e.g., NR carrier B, as shown in FIG. 2*a*). The LTE base station 106 may select an NR carrier based at least on the performance measurements 204. The selection and instruction, as well as other operations described herein, may be performed by a radio resource controller of the LTE base station 106. Additionally, the LTE base station 106 is configured to communicate with an associated NR base station 108 in order to establish a secondary data connection between the UE 110 and the NR base station 108.

FIG. 2*b* illustrates the failure at 208 of a connection or connection attempt between the UE 110 and the NR base station 108 via the selected NR carrier (e.g., NR carrier B). Such a failure, despite the performance measurements, could be the result of many issues. For example, the NR carrier could support strong downlink but weak uplink, with the weak uplink going undetected by the performance measurements 204. In some implementations, the failure at 208 may be an SCG failure indicating that the link via the NR carrier is not good enough to maintain a call. When notified of or detecting the failure at 208, the LTE base station 106 may then tear the connection via the NR carrier (also referred to as tearing down an "NR leg" of an EN-DC connection). In some implementations, the LTE base station 106 may also update a failure indicator of the LTE base station 106 (e.g., a performance counter) associated with the UE 110 and the NR carrier used in FIG. 2*b*.

FIG. 2*c* illustrates the LTE base station 106 providing an updated list of NR carriers 210 to UE 110, receiving a measurement report 212 from the UE 110 in response, and sending a selection 214 of an NR carrier to the UE 110 based on the measurement report 212.

Following the teardown of the connection via the NR carrier that is described further herein, the LTE base station 106 may determine which NR carriers are available to the UE 110. The LTE base station 106 may review capabilities information associated with the UE 110 and check if any failure indicators show previous connection failures for the UE 110 with any of the NR carriers of the NR base station 108. In some implementations, the failure indicators may be any one or more performance counters and corresponding thresholds updated following connection failures or failed connection attempts. Other examples of failure indicators may include flags, etc. If a threshold is met for any failure indicator, the NR carrier corresponding to that failure indicator is then omitted from the updated list of NR carriers 210. For example, in FIG. 2*c*, NR carrier B is omitted from the updated list of NR carriers 210. Such an omission may be because a number of failures has met the threshold of the failure indicator.

In some implementations, the failure indicators may be configurable. Such configurable failure indicators may have, for example, their thresholds increased or decreased based on network conditions, numbers of UEs in a cell, capabilities of adjacent UEs, energy availability, etc. In at least one implementation, configuration of failure indicators may be managed by a self-organizing network (SON) of a telecommunication network (such as system 100) which includes the LTE base station 106 and NR base station 108.

In various implementations, on a periodic or event-driven basis, the LTE base station 106 may reset the counts tracked by one or more failure indicators. For example, counts may be reset if a time since a last failure exceeds a time threshold, if a specific time of day occurs, etc.

Upon receiving the updated list of NR carriers 210, the UE 110 may perform measurements for the NR carriers included in the list 210. In FIG. 2*c*, this would mean performing measurements of NR carriers A, C, and D. The details of such measurements and the information included in measurement reports is described above with respect to measurement report 204. Following measurements, the UE 110 may transmit the measurement report 212 to the LTE base station 106.

In various implementations, the LTE base station 106 then selects an NR carrier for the UE 110 based at least on the measurement report 212. For example, as shown in FIG. 2*c*, the LTE base station 106 may select NR carrier C and may instruct the UE 110 of in a message 214 to connect to NR carrier C. The LTE base station 106 may also inform the NR base station 108 of the selection to enable the communication.

Figure 3:
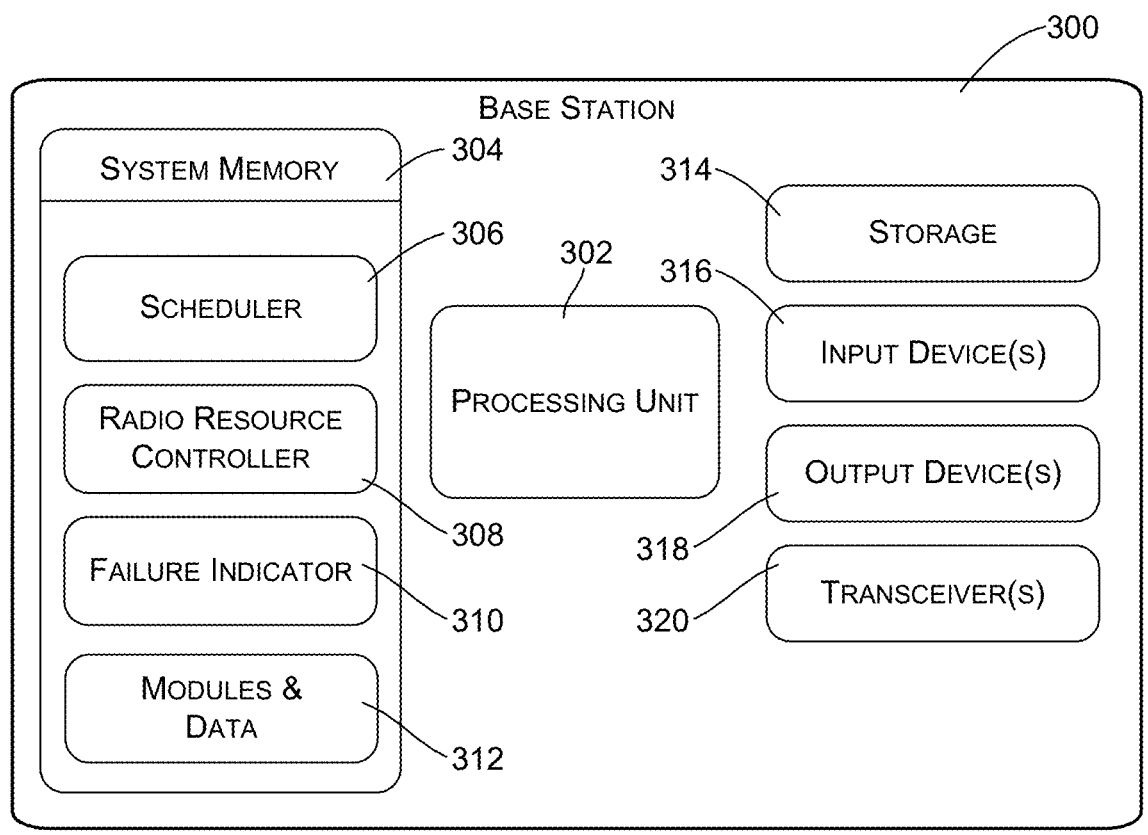
FIG. 3 is a block diagram of an example base station that may be used to implement various functionalities described herein.

FIG. 3 is a block diagram of an example base station that may be used to implement various functionalities described herein. The base station 300 may be used to implement the LTE base stations 106, for example.

In various embodiments, the base station 300 may include at least one processing unit 302 and system memory 304. Depending on the exact configuration and type of computing device, the system memory 304 may be volatile (such as RAM), non-volatile (such as ROM, flash memory, etc.) or some combination of the two. The system memory 304 may include a scheduler 306, a radio resource controller 308, a failure indicator 310, and other modules and data 312. The radio resource controller 308 and failure indicator 310 may be configured to perform operations described herein, including tracking managing a list of NR carriers and tracking connection failures associated with one of the NR carriers and a UE. Such components and operations are described further herein in detail. The scheduler 306 and other modules and data 312 may perform other operations of the LTE base station, such as coordinating use of spectrum among multiple UEs and communicating with the NR base station 108 and 4G network core 102.

The base station 300 may also include additional data storage devices (removable and/or non-removable) such as, for example, magnetic disks, optical disks, or tape. Such additional storage devices are illustrated in FIG. 3 as storage 314.

Non-transitory computer storage media of the base station 300 may include volatile and nonvolatile, removable and non-removable media, implemented in any method or technology for storage of information, such as computer readable instructions, data structures, program modules, or other data. The system memory 304 and storage 314 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by base station 300. Any such non-transitory computer-readable storage media may be part of the base station 300.

In various embodiment, any or all of the system memory 304 and storage 314 may store programming instructions which, when executed, implement some or all of the function functionality described above.

The base station 300 may also have input device(s) 316 such as a keyboard, a mouse, a touch-sensitive display, voice input device, etc. Output device(s) 318 such as a display, speakers, a printer, etc. may also be included. The base station 300 may also include transceiver(s) 320 that allow the base station 300 to communicate with other devices, such as NR base station 108 and UE 110. Such transceiver(s) 320 may include an antenna to transmit and receive radio frequency communications.

Figure 4:
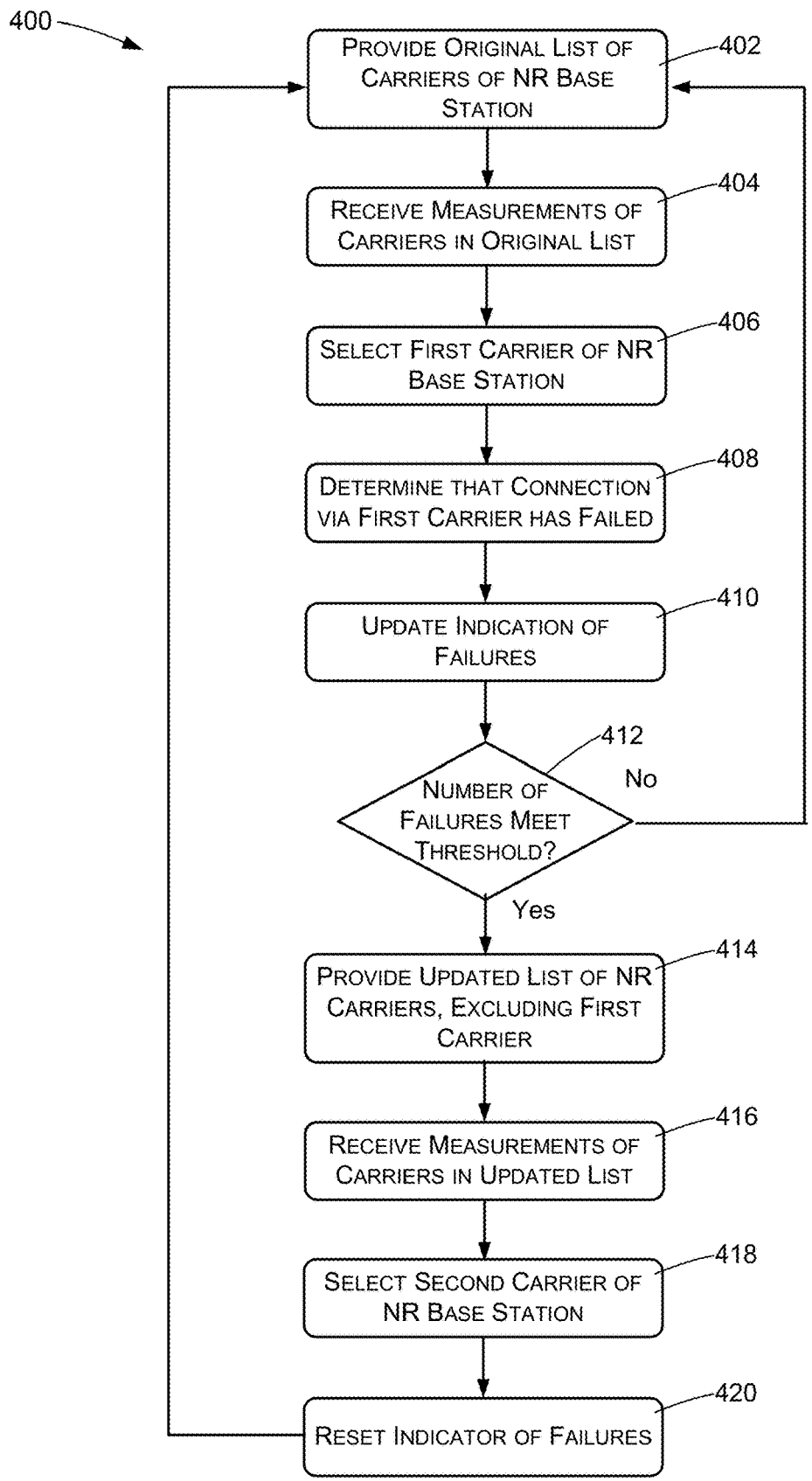
FIG. 4 is a flow diagram illustrating an example method that may be performed to avoid repeated selection of a failed NR carrier for a UE.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 is a flow diagram illustrating an example method 400 that may be performed to avoid repeated selection of a failed NR carrier for a UE. As illustrated, at 402, a first base station may provide to the UE an original list of the multiple carriers of the second base station. The original list may include at least a first carrier and a second carrier. In some implementations, the first base station may be an eNodeB in a NSA relationship with the second base station, and the second base station may be a gNodeB. Further, at least some of the operations illustrated in FIG. 4 may be performed by a radio resource controller of the first base station.

At 404, the first base station may then receive from the UE first measurements of the multiple carriers based at least in part on the original list.

At 406, the first base station may select the first carrier of a second base station for the UE based on the first measurements.

Subsequently, at 408, the first base station may determine that a connection between the UE and the second base station via the first carrier has failed.

At 410, upon determining that the connection has failed, the first base station may update an indication of a number of failures associated with the UE and the first carrier.

At 412, when the first base station determines that the number of failures meets a threshold, the first base station may provide, at 414, an updated list of the multiple carriers of the second base station to the UE. Such an updated list may exclude the first carrier. If, on the other hand, the number of failures does not meet the threshold, the first base station may repeat at least operations 402-406. In some implementations, the threshold may be configurable and vary based on at least one of network conditions or a number of UEs connected to the first base station or the second base station.

At 416, after providing an updated list, the first base station may receive from the UE second measurements of the multiple carriers included in the updated list.

At 418, based at least in part on the second measurements, the first base station may select a second carrier of the second base station for the UE based on the second measurements of the multiple carriers included in the updated list.

Further, in some implementations, at 420, the first base station may reset the threshold after a time period and, upon resetting the threshold, provide to the UE, at 402, the original list of the multiple carriers of the second base station.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   selecting, by a first base station, a first carrier of a second base station for a user equipment (UE) based on first measurements of multiple carriers of the second base station;
   determining, by the first base station, that a connection between the UE and the second base station via the first carrier has failed;
   upon determining that the connection has failed, updating an indication of a number of failures associated with the UE and the first carrier;
   providing, by the first base station, an updated list of the multiple carriers of the second base station to the UE, the updated list excluding the first carrier, wherein providing the updated list is performed conditionally based on a determination that the number of failures meets a threshold;
   receiving from the UE, by the first base station, second measurements of the multiple carriers included in the updated list;
   selecting, by the first base station, a second carrier of the second base station for the UE based on the second measurements of the multiple carriers included in the updated list;
   resetting the indication of the number of failures after a time period; and
   upon resetting the indication, providing to the UE, by the first base station, an original list of the multiple carriers of the second base station, the original list including at least the first carrier and the second carrier.

2. The method of claim 1, further comprising, before selecting the first carrier:
   providing to the UE, by the first base station, an original list of the multiple carriers of the second base station, the original list including at least the first carrier and the second carrier; and
   receiving from the UE, by the first base station, the first measurements of the multiple carriers based at least in part on the original list.

3. The method of claim 1, wherein the threshold is configurable and varies based on at least one of network conditions or a number of UEs connected to the first base station or the second base station.

4. The method of claim 1, wherein the first base station is an eNodeB in a non-standalone (NSA) relationship with the second base station, and the second base station is a gNodeB.

5. The method of claim 1, wherein the selecting the first carrier, the determining, the providing, the receiving, and the selecting the second carrier are performed by a radio resource controller of the first base station.

6. A first base station comprising:
a processor;
a transceiver coupled to the processor to send and receive signals; and
executable instructions configured to be operated by the processor to perform operations including:
selecting a first carrier of a second base station for a user equipment (UE) based on first measurements of multiple carriers of the second base station;
determining that a connection between the UE and the second base station via the first carrier has failed;
providing an updated list of the multiple carriers of the second base station to the UE, the updated list excluding the first carrier;
receiving from the UE second measurements of the multiple carriers included in the updated list;
selecting a second carrier of the second base station for the UE based on the second measurements of the multiple carriers included in the updated list; and
after a time period, providing to the UE, by the first base station, an original list of the multiple carriers of the second base station, the original list including at least the first carrier and the second carrier.

7. The first base station of claim 6, wherein the operations further include, before selecting the first carrier:
providing to the UE an original list of the multiple carriers of the second base station, the original list including at least the first carrier and the second carrier; and
receiving from the UE the first measurements of the multiple carriers based at least in part on the original list.

8. The first base station of claim 6, wherein the operations further include:
upon determining that the connection has failed, updating an indication of a number of failures associated with the UE and the first carrier,
wherein providing the updated list is performed conditionally based on a determination that the number of failures meets a threshold.

9. The first base station of claim 8, wherein the threshold is configurable and varies based on at least one of network conditions or a number of UEs connected to the first base station or the second base station.

10. The first base station of claim 6, wherein the first base station is an eNodeB in a non-standalone (NSA) relationship with the second base station, and the second base station is a gNodeB.

11. The first base station of claim 6, wherein the selecting the first carrier, the determining, the providing, the receiving, and the selecting the second carrier are performed by a radio resource controller of the first base station.

12. A non-transitory computer storage medium having executable instructions stored thereon, the executable instructions being configured to program a first base station to perform operations including:
selecting a first carrier of a second base station for a user equipment (UE) based on first measurements of multiple carriers of the second base station;
determining that a connection between the UE and the second base station via the first carrier has failed;
upon determining that the connection has failed, updating an indication of a number of failures associated with the UE and the first carrier;
providing an updated list of the multiple carriers of the second base station to the UE, the updated list excluding the first carrier, wherein providing the updated list is performed conditionally based on a determination that the number of failures meets a threshold;
receiving from the UE second measurements of the multiple carriers included in the updated list;
selecting a second carrier of the second base station for the UE based on the second measurements of the multiple carriers included in the updated list;
resetting the indication of the number of failures after a time period; and
upon resetting the indication, providing to the UE an original list of the multiple carriers of the second base station, the original list including at least the first carrier and the second carrier.

13. The non-transitory computer storage medium of claim 12, wherein the operations further include, before selecting the first carrier:
providing to the UE an original list of the multiple carriers of the second base station, the original list including at least the first carrier and the second carrier; and
receiving from the UE the first measurements of the multiple carriers based at least in part on the original list.

14. The non-transitory computer storage medium of claim 12, wherein the threshold is configurable and varies based on at least one of network conditions or a number of UEs connected to the first base station or the second base station.

15. The non-transitory computer storage medium of claim 12, wherein the first base station is an eNodeB in a non-standalone (NSA) relationship with the second base station, and the second base station is a gNodeB.

* * * * *